United States Patent [19]
Stewart

[11] Patent Number: 5,397,465
[45] Date of Patent: Mar. 14, 1995

[54] DIATOMACEOUS SWIMMING POOL FILTER WITH REGENERATIVE PLATES

[75] Inventor: Howard M. Stewart, Little Rock, Ark.

[73] Assignee: Jacuzzi Inc., Walnut Creek, Calif.

[21] Appl. No.: 273,607

[22] Filed: Jul. 12, 1994

Related U.S. Application Data

[63] Continuation of Ser. No. 53,597, Apr. 27, 1993, abandoned.

[51] Int. Cl.6 .................... B01D 29/64; B01D 29/52
[52] U.S. Cl. .................. 210/169; 210/106; 210/193; 210/332; 210/407; 210/408; 210/413
[58] Field of Search ............. 210/106, 169, 193, 332, 210/391, 396, 407, 408, 413

[56] References Cited

U.S. PATENT DOCUMENTS 5,198,111 3/1993 Davis .................. 210/408

OTHER PUBLICATIONS

Hayward 1992 Pool & Spa Products Catalog, ©1991 pp. 24 and 26.

Primary Examiner—Robert A. Dawson
Assistant Examiner—Robert James Popovics
Attorney, Agent, or Firm—Limbach & Limbach

[57] ABSTRACT

A filter including one or more regenerative plates which can be moved along the surfaces of filter grids to simultaneously create turbulence and physically dislodge a filter media cake within the filter by use of an externally extending driver rod, so as to regenerate the filter media.

7 Claims, 3 Drawing Sheets

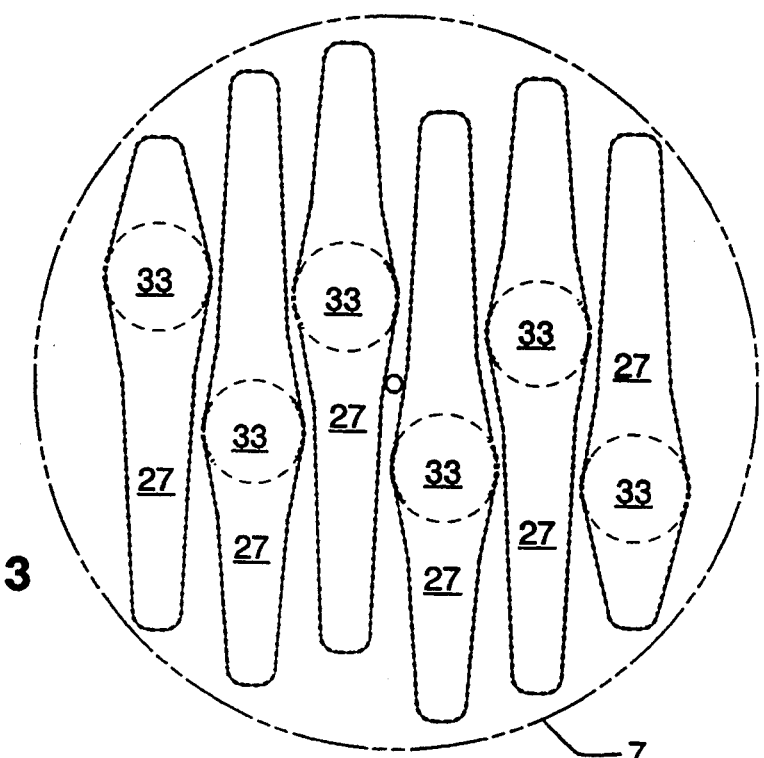
FIG. 3
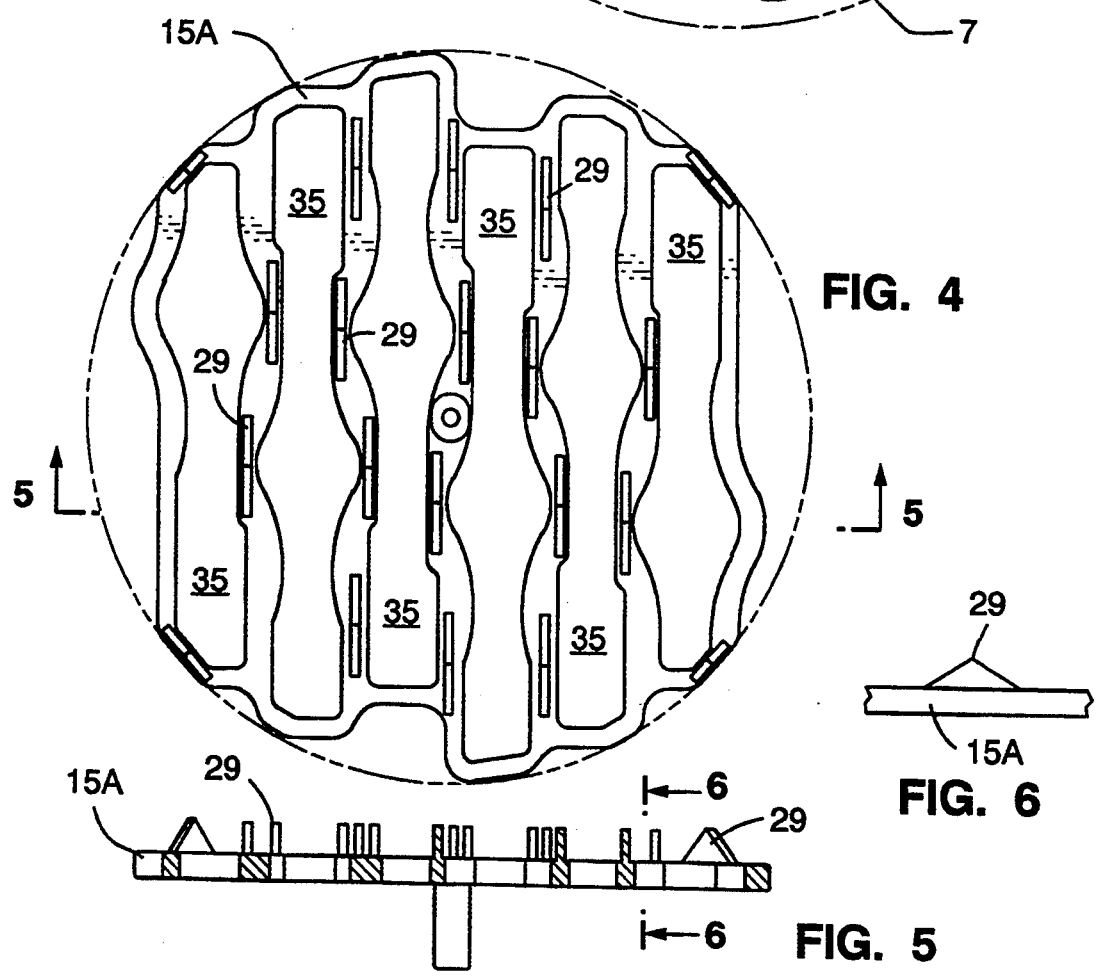
FIG. 4
FIG. 6
FIG. 5

DIATOMACEOUS SWIMMING POOL FILTER WITH REGENERATIVE PLATES

This is a continuation of application Ser. No. 08/053,597, filed on Apr. 27, 1993, now abandoned.

FIELD OF THE INVENTION

This invention relates to a filtration device of the type useful with swimming pools, wherein a filter aid, such as diatomaceous earth, is employed to remove suspended solids from water.

BACKGROUND OF THE INVENTION

Filter devices such as are used for swimming pool filtration commonly use diatomaceous earth as a filter media. In a diatomaceous earth filter a plurality of screen or cloth covered filter grids acting in parallel are coated with a layer of diatomaceous earth. Water containing suspended solids is then circulated into the filter housing, through the diatomaceous earth cake and filter grid to an outlet manifold, and ultimately returned clean to the source of the impure water.

Over the course of the filtration process, the filter cake becomes laden with dirt, the pressure drop across the filter increases, and the filtration flow rate decreases. Once the pressure drop becomes unacceptably high, the filter cake must be removed and a new coating of diatomaceous earth applied to the filter cloth or screen surface. Removal of the dirt laden filter cake can be accomplished by disassembling the filter and manually removing the cake (for example, by hosing down the diatomaceous earth covered grids).

It is known that it is advantageous to "regenerate" a diatomaceous earth filter (or more specifically, the filter media therein) rather than completely disassembling, cleaning and recoating the filter grids with a new layer of diatomaceous earth. By "regenerate," it is meant that the dirt laden diatomaceous earth filter cake is, in some manner without disassembling the filter, removed from the surface of the grids, and then allowed to redeposit on the grids to form a regenerated diatomaceous earth layer.

Regeneration can be accomplished, for example, by reversing the flow of liquid through the filter cloth or screen to dislodge the cake within the housing and allowing it to recoat when the filter operation is restarted. By regenerating the filter cake, more efficient use of a single treatment of diatomaceous earth is achieved. After the cake is regenerated a number of times and the contaminant level becomes too great, the diatomaceous earth cake must then be removed by the usual disassembly means. Structures have also been proposed to provide a way to dislodge the cake. For example, U.S. Pat. No. 3,310,175 describes a diatomaceous earth filter which utilizes helical springs surrounding tubular up-flow filter grids wherein the springs can be moved to physically remove dirt laden diatomaceous earth. Another example is U.S. Pat. No. 4,944,887 which describes a diatomaceous earth filter including filter grids disposed in a spiral fashion, which grids can be moved (from the exterior of the filter) by the use of a handle to "bump" and thereby dislodge and regenerate diatomaceous earth from the surface of the filter grids. The '887 patent also describes how the movement of the filter grids creates turbulence within the water to strip the filter cake.

It would be advantageous to have an easily manufactured and maintained structure which could nevertheless achieve the necessary regeneration of the diatomaceous earth filter by combining more than one of these physical or turbulence type cake removal modes.

Thus, previous regenerative diatomaceous earth filter designs have incorporated either a structure for physically dislodging the filter-aid cake or a structure for moving the filter grids to create turbulence, which turbulence is used to dislodge the cake. It is therefore an object of the present invention to achieve a design for a regenerative filter which takes advantage, simultaneously, of both physical dislodging of a filter aid cake, and the use of turbulence to speed and complete the removal of the filter cake.

SUMMARY OF THE INVENTION

In order to achieve this object, the present invention provides a filter which utilizes a filter media such as diatomaceous earth and which includes a simple yet effective regenerating structure in which at least one regenerative plate is positioned within the filter housing, the regenerative plate being secured to a driving rod extending from the interior to the exterior of the housing. Movement of the regenerative plate via the rod permits a filter operator to move the regenerative plate along the surfaces of filter grids within the housing to physically disturb the diatomaceous earth filter cake thereon and simultaneously create turbulence using plunging action from the regenerative plate.

Thus, in a first embodiment, the invention is a filter comprising a filter housing including an inlet port and an outlet port, fluid flow path means for carrying fluid to be filtered through said filter housing from said inlet port to said outlet port, said fluid flow path means including filter means for filtering incoming fluid, said filter means comprising filter grids, each having controlled porosity inlet surfaces along a length thereof; and, regeneration means for regenerating said filter, said filter regeneration means comprising; a first filter aid regenerative plate, said first plate being positioned within said housing perpendicular to said length of said filter grid inlet surfaces and movable along said length and having filter grid openings therein for said filter grids, said filter grids being positioned within said openings, wherein said filter grid openings are surrounded by an edge and said edge is shaped to substantially correspond to a cross-sectional shape of said inlet surfaces of said filter grids; and a driver rod connected to said plate, said rod extending from within said filter housing to a position exterior to said housing.

In a second embodiment, the filter regeneration means further comprises a second regenerative plate, said second plate being positioned within said housing perpendicular to said length of said filter grid inlet surfaces and movable along said length and having a filter grid openings therein for said filter grids, said filter grids being positioned within said openings, wherein said filter grid openings are surrounded by an edge and said edge is shaped to substantially correspond to a cross-sectional shape of said inlet surfaces of said filter grids; said second plate being spaced from said first plate along said rod.

In a further embodiment, the filter grids of the invention may further include outlet conduits and said filter means may further comprises a filter grid outlet manifold, said manifold having a number of manifold inlets corresponding to the number of said filter grid outlet conduits, and a manifold outlet from said manifold communicating with said filter housing outlet port.

In yet another embodiment, the invention further comprises protrusions on an upper surface of said first regenerative plate, at least some of said protrusions being positioned adjacent said edge of said filter grid openings, and protruding in a direction parallel to said length of said filter grid inlet surfaces.

In a further embodiment, said rod is connected to and extends through a central portion of said first plate, and extends to and is connected to a central portion of said second plate.

In a further embodiment still, the invention is a filter comprising a filter housing; inlet and outlet ports in said housing; and filter grids positioned within said housing such that inlet fluid flow must pass through a filter aid bearing surface of each of said grids to reach said outlet port; said filter further comprising filter regeneration means for dislodging a layer of filter aid positioned on said filter aid bearing surface, said regeneration means comprising a pair of plates connected to a rod extending from the interior of said housing to the exterior of said housing, each of said plates having a number of openings therein, and at least some of said openings being shaped to substantially correspond to a cross-sectional shape of said filter aid bearing surface, said plates being spaced from one another within said housing and movable along said filter aid bearing surfaces by movement of said handle.

In yet another embodiment, the invention is a diatomaceous earth swimming pool filter comprising the filter housing having inlet and outlet ports; six filter grids positioned within said housing, each of said grids covered with a filter cloth; means for dislodging a diatomaceous earth filter cake on a surface of each of said grids said dislodging means comprising a regenerative plate having at least six openings therein, each one of said openings substantially corresponding to a cross-sectional shape of one of said grids, a rod connected to a central portion of said plate and extending from said plate through said housing, said plate being moveable from a bottom portion of said housing to a top portion of said housing along said filter grid surfaces by movement of said handle.

BRIEF DESCRIPTION OF THE DRAWINGS

The present invention will be better understood by reference to the appended drawing figures, of which:

FIG. 3 is a plan view showing the cross-sectional shape of the filter grid elements within the filter;

FIG. 4 is a top view of a regenerative plate according to the invention;

FIG. 5 is a cross-sectional view of the regenerative plate of FIG. 4 taken along line 5—5; and FIG. 6 is a cross-sectional view of the regenerative plate of FIG. 5 along line 6—6.

DETAILED DESCRIPTION OF THE INVENTION

The present invention provides an unusually effective structure for regenerating a diatomaceous earth filter wherein a diatomaceous earth cake is used on the surface of filter grids within the filter. The most common application of the invention will be for filtration of water from a swimming pool. The Figures depict the most preferred embodiment of the invention. Throughout this specification diatomaceous earth is the filter aid or media described, though the invention can be used to regenerate any similar filter media.

Figure 1:
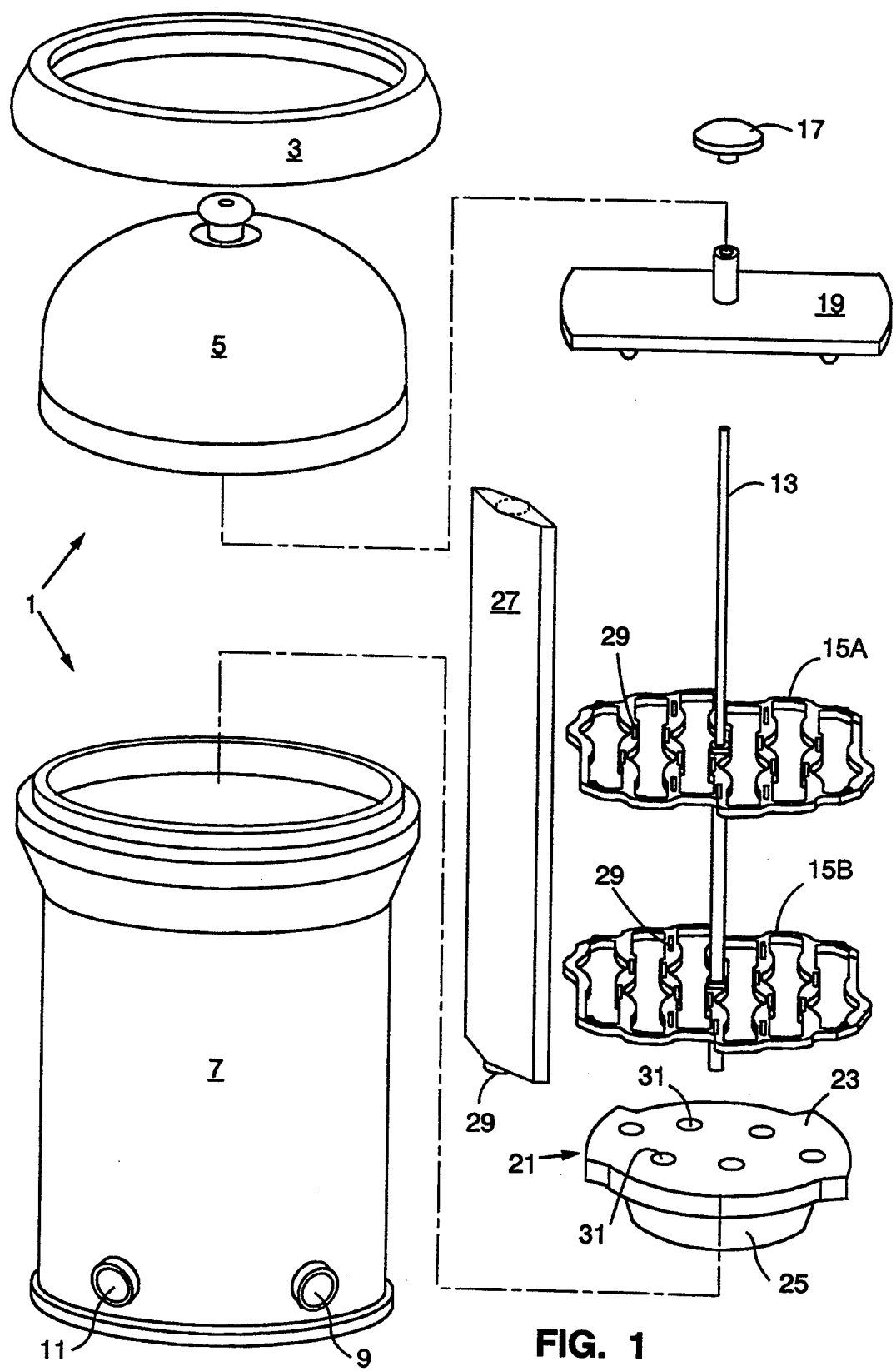
FIG. 1 is an exploded perspective view of the components of the filter of the invention.

FIG. 1 is an exploded perspective view of the invention. In FIG. 1 filter assembly 1 is made up of a filter housing 7, a filter cover 5 and a nut 3. Nut 3 is threaded to securely hold cover 5 on a threaded portion of housing 7 (see FIG. 2). Housing 7 has an inlet port 11 and an outlet port 9. In operation, contaminated water containing suspended solids will pass into the filter housing via port 11, and filtered water will return to a swimming pool via outlet port 9.

Still referring to FIG. 1, a support plate 19 is used within an end, in this case upper, portion of the interior of filter assembly 1. Support plate 19 is designed to maintain engagement of the grids in the manifold and to ensure proper relative positioning of the grids, such as filter grid 27, in place when the filter unit is assembled. Positioned in the other end, in this case bottom, portion of filter assembly 1 is an outlet manifold 21 comprising manifold cover 23 and manifold body 25.

Positioned between support plate 19 and outlet manifold cover 23 is rod 13 on which regenerative plates 15A and 15B are positioned. When assembled, the filter unit most preferably includes six filter grids 27, though only one is shown in this view. Filter grid 27 includes an interior support structure (not shown), and a grid outlet conduit 29. Grid outlet conduit 29 is secured within one of the holes 31 in outlet manifold cover 23. It should be noted that the present invention is not limited to a particular type of filter grid, or even filter cloth or screen, but can be used with any grid or porous pipe arrangement, the surface of which carries filter media.

Figure 2:
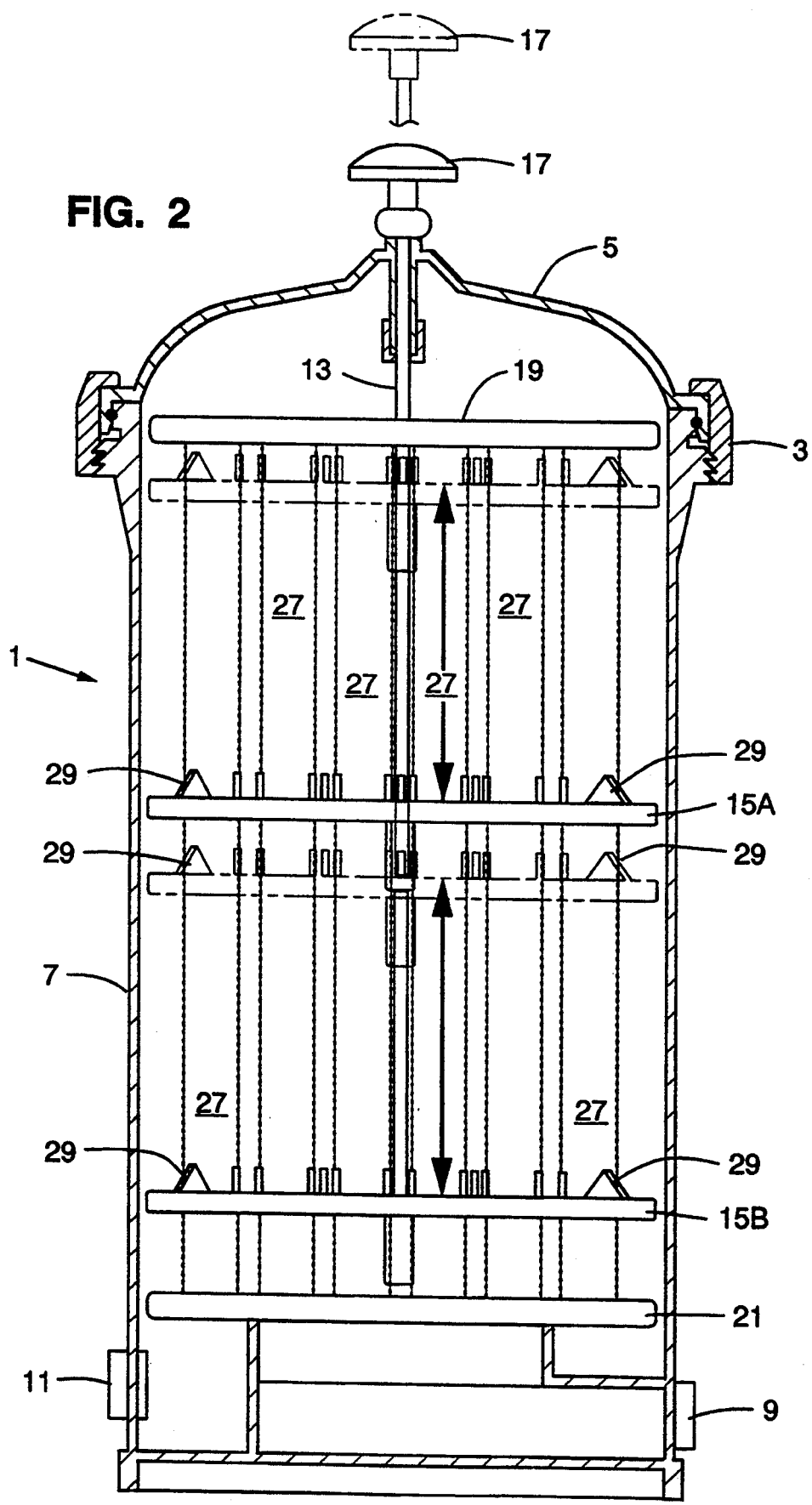
FIG. 2 is a partial cross-sectional view of the fully assembled filter of the invention indicating the movement of the regenerative plate assembly.

In all figures herein, including FIG. 2, like filter components are numbered as in FIG. 1. FIG. 2 is a cross-sectional view of filter assembly 1 showing how regenerative plates 15A and 15B are moved within the fully assembled filter. In use, the regeneration system permits an operator to lift driver rod 17, thereby moving both regenerative plates 15A and 15B upwardly along the surfaces of filter grids 27. Openings in the regenerative plates (see FIG. 4) are designed to accommodate the grid assembly and allow the regenerative plates to be moved about that assembly. Since at least a portion of the edges of the openings in the plate substantially correspond to the shape of the cross section of the surfaces of the grids and is adjacent thereto, this action physically dislodges the diatomaceous earth filter cake on the surfaces of filter grids 27 as regenerative plates 15A and 15B are raised. Importantly, this action also creates vigorous turbulence around the filter grid surfaces. Teeth 29, strategically positioned along the upper surfaces adjacent the openings in the plates (see detail FIG. 6) provide an especially advantageous means for breaking up heavy deposits of diatomaceous earth, commonly referred to as "bridging" between the filter grids as the plates are moved. In testing the regenerative plates according to the invention, it was found that using teeth or protrusions, such as teeth 29, positioned on the upper surfaces of the regenerative plates greatly facilitated removal of the filter cake.

In FIG. 2, as handle 17 is moved to its uppermost position, regenerative plates 15A and 15B are moved to the position shown in phantom lines. A single regenerative plate can be used, but would require a longer handle.

During the operation of any such filter, the filter media will become completely laden with dirt which will require that the media be regenerated and, ultimately, the filter grids must be manually cleaned. As the dirt load on the filter grids increases, the pressure inside the filter increases and flow to the pool decreases. Generally, it has been found that the filter media should be regenerated when flow to the pool diminishes to about ⅔ of the original flow rate.

FIG. 3 is a top view of the position of filter grids 27 within filter housing 7. In this embodiment, filter grids 27 include a pipe shaped central support 33 which forms part of the internal grid structure (not shown). Polypropylene cloth or other controlled porosity material is placed or stretched around grids 27 to form the surface on which the diatomaceous earth cake is held during filtration.

The manufacturability of the grids is efficient in this design since the four central grids are the same and the two outermost grids are likewise the same.

FIG. 4 is a top view of regenerative plate 15A. Regenerative plate 15A includes openings 35 for each of grids 27. Teeth 29 are positioned on the upper surface of plate 15A. The position of teeth 29 is shown in further detail in FIG. 5. The preferred shape of such teeth is shown in FIG. 6.

Regenerative plates 15A and B can be made any material which is sufficiently stiff to retain its shape when used in the filter assembly.

To regenerate the filter media, driver rod 17 is pumped up and down several times until the handle moves freely, indicating that the diatomaceous earth filter cake has been dislodged. The agitated filter media is then allowed to reform a new cake on the surfaces of filter grids 27.

It is important in the invention that the inner edges of openings 35 in plate 15A (FIG. 4) substantially correspond to the cross-sectional shape of the surfaces of grids 27 along at least a portion thereof, and be adjacent thereto. By "substantially corresponding" it is meant that the shape of the openings should correspond to the cross-sectional shape of the grid surfaces. By "adjacent thereto" it is meant that the portion of the edge of each opening which substantially corresponds to the shape of the grid surfaces is positioned close enough to the filter cake to provide physical scraping of the cake. As in the preferred embodiment shown herein, while the edges of the plate openings substantially correspond to the cross-sectional shape of the filter grids, the space between the opening edge and the grid surface will vary depending upon the thickness of the filter cake in a particular type of filter and the need to have at least some opening (i.e., some portion of the edge which is not adjacent the surface of the cake) to permit fluid to pass between the opening edge and the grid surface to promote the plunging action of the plate.

"Substantially corresponding" is also intended to include full correspondence in the shapes of the opening and filter grid surfaces, without extra spacing to allow the passage of fluid, since the passage of fluid can be accommodated by the use of ports or holes elsewhere in the plate.

Although only the most preferred embodiment of the invention has been shown and described, modifications and rearrangements of the components of the filter of the invention will be apparent to those skilled in the filtration art, and modifications which include such features are therefore considered to be within the scope of the appended claims.

What is claimed is:

1. A filter comprising:
   (a) a filter housing including an inlet port and an outlet port;
   (b) fluid flow path means for carrying fluid to be filtered through said filter housing from said inlet port to said outlet port, said fluid flow path means including filter means for filtering incoming fluid, said filter means comprising filter grids, each having controlled porosity inlet surfaces along a length thereof; and
   (c) regeneration means for creating turbulence around the filter grids, said filter regeneration means comprising;
      (1) a first filter aid regenerative plate, said first plate being positioned within said housing perpendicular to said length of said filter grid inlet surfaces and movable along said length and having filter grid openings therein, said filter grids being positioned within said openings wherein said filter grid openings are surrounded by an edge and said edge is shaped to substantially correspond to a cross-sectional shape of said inlet surfaces of said filter grids, and a plurality of teeth on an upper surface of said first regenerative plate positioned adjacent said edge, and protruding in a direction parallel to said length of said filter grid inlet surfaces; and
      (2) a driver rod secured to said plate, said rod extending from within said filter housing to a position exterior to said housing.

2. A filter as in claim 1 wherein said filter regeneration means further comprises a second regenerative plate, said second plate being positioned within said housing perpendicular to said length of said filter grid inlet surfaces and movable along said length and having filter grid openings therein for said filter grids, said filter grids being positioned within said openings, wherein said filter grid openings are surrounded by an edge and said edge is shaped to substantially correspond to a cross-sectional shape of said inlet surfaces of said filter grids;

said second plate being spaced from said first plate along said rod.

3. A filter as in claim 1 wherein said filter grids further include outlet conduits and said filter means further comprises a filter grid outlet manifold, said manifold having a number of manifold inlets corresponding to the number of said filter grid outlet conduits, and a manifold outlet from said manifold communicating with said filter housing outlet port.

4. A filter as in claim 2 wherein said rod is connected to and extends through a central portion of said first plate, and extends to and is connected to a central portion of said second plate.

5. A filter comprising:

a filter housing having a generally circular cross-section;

inlet and outlet ports in said housing; and filter grids positioned within said housing such that inlet fluid flow must pass through a filter aid bearing surface of each of said grids to reach said outlet port;

said filter further comprising filter regeneration means for creating turbulence to dislodge a layer of filter aid positioned on said filter aid bearing surface, said regeneration means comprising a pair of plates secured to a rod extending from the interior of said housing to the exterior of said housing, each of said plates having a number of openings therein, and at least some of said openings including an edge shaped to substantially correspond to a cross-sectional shape of said filter aid bearing surface, and a plurality of teeth on an upper surface of an upper one of said pair of plates positioned adjacent said edge of said filter grid openings along a length of said filter aid bearing surface, said plates being spaced from one another within said housing and movable along said filter aid bearing surfaces by movement of said rod.

6. A filter as in claim 5 further comprising teeth on an upper surface of said second regenerative plate, said teeth protruding in a direction parallel to said filter aid bearing surfaces.

7. A diatomaceous earth swimming pool filter comprising a filter housing having inlet and outlet ports;

six filter grids positioned within said housing, each of said grids covered with a filter cloth;

means for creating turbulence to dislodge a diatomaceous earth filter cake on a surface of each of said grids, said turbulence creating means comprising a regenerative plate having at least six openings therein, each one of said openings substantially corresponding to a cross-sectional shape of one of said grids and having an edge, a plurality of teeth on an upper surface of said plate positioned adjacent said edge and along a length of said filter grid surfaces, a rod secured to a central portion of said plate and extending from said plate through said housing, said plate being moveable from a bottom portion of said housing to a top portion of said housing along said filter grid surfaces by movement of said rod.

* * * * *